United States Patent

[11] 3,621,047

| [72] | Inventors | Hans Dietrich Golitz<br>Cologne;<br>Walter Simmler, Odenthal-Schlinghofen;<br>Peter Schwabe, Leichlingen, all of Germany |
|---|---|---|
| [21] | Appl. No. | 857,203 |
| [22] | Filed | Sept. 11, 1969 |
| [45] | Patented | Nov. 16, 1971 |
| [73] | Assignee | Farbenfabriken Bayer Aktiengesellschaft<br>Leverkusen, Germany |
| [32] | Priority | Sept. 20, 1968 |
| [33] | | Germany |
| [31] | | P 17 94 197.8 |

[54] A BIS-AND TRIS-TRIALKOXYSILYLALKYLAMINES
5 Claims, No Drawings

[52] U.S. Cl. .................................................. 260/448.8 R,
260/46.5 R, 260/46.5 E, 260/46.5 G
[51] Int. Cl. ........................................................ C07f 7/04
[50] Field of Search ............................................. 260/448.8 R

[56] References Cited
UNITED STATES PATENTS

| 2,832,754 | 4/1958 | Jex | 260/448.8 R X |
| 2,955,127 | 10/1960 | Pike | 260/448.8 R X |
| 3,044,982 | 7/1962 | Jex et al. | 260/448.8 R X |
| 3,171,851 | 3/1965 | Pepe | 260/448.8 R X |
| 3,477,901 | 11/1969 | Keil | 260/448.8 R X |

Primary Examiner—Tobias E. Levow
Assistant Examiner—P. F. Shaver
Attorney—Burgess, Dinklage & Sprung ABSTRACT: Novel cross-linking agents are disclosed which can be combined with plastically shapable organopolysiloxanes; the resulting novel mixtures or compositions being storage stable under exclusion of all moisture. The cross-linking reaction takes place on exposure of the compositions to water, atmospheric humidity sufficing, at temperatures below 50° C. The compositions are especially adapted to be used for the filling of joints and as sealing materials in the building industry. The elastomers resulting therefrom have an increased adhesion to the substrate saving the expenditure of priming, and are transparent. The novel compositions comprise:

A. an $\alpha,\omega$-dihydroxy-poly-(diorgano-siloxane) which, in addition to its diorganosiloxane units, may contain up to 10 mol-percent of siloxane units having the formula $CH_3SiO_{3/2}$, and may be admixed with fillers and an $\alpha,\omega$-bis-(trimethyl-siloxy)-poly-(diorgano-siloxane); and B. a cross-linking agent having the formula $[(RO-)_3Si-CH(R')-]_nNQ_{3-n}$
in which $n$ is 2 or 3, R is an alkyl radical with 1 to 4 carbon atoms, R' is a hydrogen atom, an alkyl radical with 1 to 6 carbon atoms, a cyclohexyl radical a phenyl radical, and Q is an alkyl or alkenyl radical with 2 to 4 carbon atoms, an aralkyl radical with 7 to 10 carbon atoms, a dimethylaminoalkyl radical with 2 to 4 carbon atoms in its alkylene group, or a methoxy- or ethoxy-ethyl or -propyl radical.

A BIS- AND TRIS-TRIALKOXYSILYLALKYLAMINES

The invention relates to plastic organopolysiloxane compositions, and especially to such compositions which contain cross-linking agents and which are transformed into an elastic solid state at temperatures below 50° C. in the presence of water, including atmospheric water vapor. This invention constitutes a modification of the invention described and claimed in our copending U.S. Pat. application Ser. No. 764,327.

A number of such compositions are known and are used for various purposes. Recently they have increasingly been used in the building industry for the filling of joints and as sealing materials. For this purpose, the cross-linked elastic product must solidly adhere to the adjoining structural element and must not become detached, even in the case of deformations such as are caused, for example, by changes of temperatures. This has hitherto been achieved in many cases by coating the substrate with a suitable primer, but the inconvenient expenditure for such an additional operation is a disadvantage.

Consequently, there exists a demand for organopolysiloxane compositions giving elastomers which adhere well to silicate building materials, to metals, such as aluminum and alloy steel, which have recently been used to an ever increasing extent, for example, for wall covering, and also to synthetic resins, without the necessity of any prior treatment of the substrate. Among other properties, special consideration must be given to the duration of the plastic moldability after the start of the influence of moisture; this should generally be of the order of 30 minutes. It is desirable that a cross-linked film should be then formed on the free surface to prevent the continuous absorption of dirt and unintentional deformation.

Among the known materials of the type described above, those containing an acyloxy-silicon compound as the cross-linking agent have the disadvantages (a) that they form free acids during cross-linking, and (b) that they solidly adhere only to a limited number of building materials after cross-linking.

Those known materials in which the cross-linking agents are silyl derivatives of acylamides or oximes admittedly yield final products of neutral reaction, but their adhesion is even poorer than that of the products mentioned above.

The likewise known materials containing aminosilanes or aminosilazanes as cross-linking agents exhibit a more satisfactory adhesion, but the hydrolytic cross-linking reaction leads to amines which have an unpleasant odor and are slightly toxic.

In our application Ser. No. 764,327 we have disclosed and claimed the use of new nitrogen-containing cross-linking agents which lead to elastomers of improved adhesion and which consist of compounds of the general formula $$(RO-)_3Si-CH(R')-N(R'')-R'''$$

in which

R is an alkyl radical with one to four carbon atoms,
R' is a hydrogen atom, an alkyl radical with one to six carbon atoms or a phenyl radical,
R'' is a hydrogen atom or a methyl radical and
R''' is a hydrogen atom, an alkyl, cycloalkyl, aminoalkyl, (methylamino)-alkyl or (dimethylamino)alkyl radical with one to six carbon atoms in its alkylene group, or a radical of the general formula $(RO-)_3Si-CH(R')-$ or of the general formula $(RO-)_3Si-CH(R')-N(R'')-CH_2CH_2-$.

We now propose the use, as nitrogen-containing cross-linking agents, of certain primary amines which are substituted twice or three times on the nitrogen by trialkoxy-silyl-hydrocarbon radicals. This leads to a reduced use of amines, some of which are expensive, and since the cross-linking agents have a higher molecular weight and the molding compositions into which they are mixed contain less amine nitrogen, the already weak toxicity of the amine derivatives and the inconvenience through odor during application are further reduced in comparison with the hitherto known molding compositions. MOreover the improved process offers the frequently important advantage that the elastic products obtained thereby are transparent.

According to the invention, therefore, an organopolysiloxane composition storable with the exclusion of water and convertible into an elastic molding or coating under the influence of water or water vapor, including that of the atmosphere, at temperatures below 50° C, comprises (A) an α, ω-dihydroxy-poly-(diorganosiloxane) which, in addition to its diorganosiloxane units, may contain up to 10 molar percent of siloxane units of the formula $CH_3SiO_{3/2}$, and (B) a nitrogen-containing organosilicon compound as cross-linking agent, optionally in admixture with fillers, optionally also in admixture with an α, ω-bis-(trimethylsiloxy)-poly-(diorganosiloxane), the nitrogen-containing cross-linking agent having the general formula $$[(RO-)_3Si-CH(R')-]_n NQ_{3-n}$$

in which n is 2 or 3,
R is an alkyl radical with one to four carbon atoms,
R' is a hydrogen atom, an alkyl radical with one to six carbon atoms, a cyclohexyl radical or a phenyl radical, and
Q is an alkyl or alkenyl radical with two to four carbon atoms, an aralkyl radical with seven to 10 carbon atoms, a dimethylaminoalkyl radical with two to four carbon atoms in the alkylene radical, or a methoxy- or ethoxy-ethyl or -propyl radical.

The quantitative proportions of the components of the composition, and its manner of manufacture, are analogous to those of the known materials. As a rule, the polysiloxane with terminal hydroxyl (i.e. component (A)) is admixed with 2 to 25 percent of cross-linking agent (B), referred to its weight. To this is usually added up to 135 percent by weight, based on the total weight of components (A) and (B), of fillers which may be active, such as finely divided silica, or inactive, such as zinc oxide or calcium carbonate, or mixtures of both types. Depending on the demands made on the technical properties of the cross-linked product, substantial amounts, for example up to 50 percent by weight, based on the weight of component (A), an α, ω-bis-(trimethyl-siloxy)-poly-(diorganosiloxane) may be added as plasticizer. In order to obtain highly elastic products, it is preferred to use a component (A) which contains $CH_3SiO_{3/2}$ units.

It is also possible to include in the composition, in known manner, suitable metal compounds, especially dialkyl-tin dicarboxylates, in order to accelerate the cross-linking reaction. The production of compositions according to the invention will usually be carried out by first kneading together the substantially anhydrous noncross-linking components to form a base paste, then adding the cross-linking agent to the latter and finally degassing the whole mixture by reducing the pressure at room temperature.

These mixtures are stable on storage when water is excluded. When brought into the open air for use they form a coherent film on the surface after a period of time of 15 minutes to 2 hours and solidify within an adequate period of time, i.e. within 24 hours progressing by 2 to 6 mm. in depth to form elastic moldings or coatings which adhere to siliceous substrates, many metals and some organic substances. They do not split off either acids or amines. The specific odor of the cross-linking agent they contain is only slight because of the lower vapor pressure.

For some purposes, especially for the filling of joints, there are predominantly suitable those of the compositions disclosed herewith, in which the cross-linking agent is an alkenylamino or aralkylamino compound, because the period of time then available before a film has been formed on the free surface of the compositions is particularly appropriate to the technical requirements.

The following examples are given for the purpose of illustrating the invention. The cross-linking agents used in the examples and designated as E1, E2, E3 and E4, are prepared as follows:

Cross-linking agent E1

$$[(C_2H_5O-)_3Si-CH_2-]_2N-CH_2-CH=CH_2$$

A solution of 425 g. (2 mol) chloromethyl-triethoxy-silane and 57 g. (1 mol) allylamine are boiled under reflux in 1 liter triethylamine for 60 hours and the precipitated triethyl ammonium chloride is filtered off. From the filtrate there is obtained by distillation at 0.3 to 0.4 mm. Hg between 110° and 120° C. a fraction of a material having a structure according to the above formula.

Cross-linking agent E2

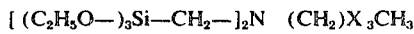

A mixture of 425 g. (2 mol) chloromethyl-triethyoxy-silane, 73 g. (1 mol) n-butylamine and 809 g. (8mol) triethylamine is heated under reflux at about 85° C. for 24 hours and the precipitated triethyl ammonium chloride is then filtered off. From the filtrate there is obtained by fractional distillation at 0.6 mm. Hg between 107° and 112° C. a colorless clear liquid having a structure according to the above formula.

Cross-linking agent E3

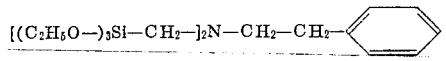

A mixture of 425 g. (2 mol) chloromethyl-triethoxy-silane, 121 g. (1 mol) 1-amino-2-phenylethane and 1,483 g. (8 mol) tri-n-butylamine is boiled under reflux for 8 hours. After separation of the ammonium salt, there is obtained by fractional distillation at 0.8 Xmm. Hg between 152° and 159° C. a colorless clear liquid having a structure according to the above formula.

Cross-linking agent E4

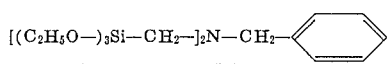

A mixture of 425 g. (2 mol) chloromethyl)-triethoxy-silane, 109 g. (1 mol) benzylamine and 1,214 g. (12 mol) triethylamine is boiled under reflux for 6 hours and the precipitated salt is then filtered off. From the filtrate there is obtained by fractional distillation at 0.45 mm. Hg between 137 and 145° C. a colorless clear liquid having a structure according to the above formula.

For the mixtures according to the following examples 1 to 4 and the comparative experiments A to D there was used a "-base" paste consisting of 1,590 g. α, ω-dihydroxy-poly-(dimethylsiloxane) of 18,000 cst. viscosity at 20° C., 600 g. α, ω-trimethyl-siloxy-poly-(dimethylsiloxane) of 1,000 cst. viscosity at 20° C., 200 g. of finely divided silica and 234 g. of finely ground calcium carbonate, and containing 0.06 g. of finely ground calcium carbonate, and contaiing 0.06 percent by weight of water.

Example 1

Five grams of the cross-linking agent E1 are mixed with 100 g. of the base paste described above to produce a molding mass which is still unchanged after 4 months when stored with the exclusion of water. In the open air at 20° C. and 50 to 60 percent relative humidity, it forms a coherent film on the surface within about 45 minutes.

To test the adhesion, this molding mass was applied in layers of 4 mm. thickness, 20 mm. width and 50 mm. length onto a number of materials which are indicated in the annexed table. These layers were transformed into elastic solid parts after about 24 hours.

Example 2

Five grams of the cross-linking agent E2 are mixed with 100 g. of the base paste. The molding mass so obtained has the same stability in storage as the product of example 1 and forms in air at 20° C. and 50 to 60 percent relative humidity a coherent film on the surface within about 15 minutes. When applied 4 mm. thick onto the materials indicated in the annexed table in the manner described in example 1, this molding mass was completely cross-linked after about 24 hours.

Example 3

Five grams of the cross-linking E3 are mixed with 100 g. of the base paste. The molding mass so obtained has the same stability in storage as the products of examples 1 and 2. When applied 4 mm. thick onto the materials indicated in the annexed table in the manner described in example 1, the molding mass forms in air at 20° C. and 50 to 60 percent relative humidity a coherent film on the surface within about 20 minutes and is completely cross-linked after about 30 hours.

Example 4

Five grams of the cross-linking agent E4 are mixed with 100 g. of the base paste, and there is thus obtained a molding mass of the same stability in storage as the products of examples 1 to 3. In the open air it forms a coherent film on the surface within about 40 minutes and is cross-linked to a depth of 4 mm. in the course of about 40 hours.

The following table gives the results of adhesion tests which were carried out with the materials described in examples 1 to 4 on various substrates. A number of known molding masses obtained by mixing 100 g. of the base paste used in examples 1 to 4 and A. 5 g. methyl-triacetoxy-silane,
B. 5 g. methyl-tri-(cyclohexylamino)-silane,
C. 5 g. of a cross-linking agent of the formula $CH_3 13 Si[—O—N \cdot C(CH_3)—C_2H_5]_3$ and 0.8 g. dibutyl-tin dilaurate,
D. 5 g. of a cross-linking agent of the formula $C_2H_5O—Si(CH_3)[b—N(CH_3)—C(=O)—C_6H_5]_2$ and 0.3 g. dibutyl-tin dilaurate were tested in the same way for comparison.

In the cases marked + the layers applied to the materials stated in the first column of the table could not be removed from the substrate after 4 days without destroying the shaped part, as is required for a satisfactory joint-packing material, whereas in the cases marked o, the layers could be removed without being destroyed.

| Adhesion to | Examples | | | | Comparison | | | |
| --- | --- | --- | --- | --- | --- | --- | --- | --- |
| | 1 | 2 | 3 | 4 | A | B | C | D |
| Aluminum | + | 30 | + | + | + | + | o | o |
| Iron | + | o | + | o | + | + | O | o |
| Alloy steel | + | O | + | + | O | o | o | o |
| Zinc | + | + | + | + | o | o | o | o |
| Nickel | + | + | o | + | o | o | o | o |
| Brass | + | + | + | + | + | o | o | o |
| Copper | + | + | + | + | + | o | o | o |
| Glass | + | + | + | + | + | + | + | + |
| Ceramics | + | + | + | + | + | + | + | o |
| Enamel | + | + | + | + | + | + | o | o |
| Asbestos cement | + | o | + | + | o | + | + | + |
| Heat cured siloxane elastomer | + | + | + | + | + | + | + | o |
| Polyester with glass fibers | + | + | + | + | + | o | + | o |
| Phenol resin | + | + | + | + | + | + | o | o |
| Polyvinyl chloride | o | + | + | o | o | o | o | o |
| Styrene-butadiene-acrylonitrile resin | + | + | o | o | o | o | o | o |
| Acrylate resin | o | + | o | o | o | o | o | o |
| Polycarbonate | o | + | + | o | + | o | o | o |
| Wood | + | + | + | + | o | + | o | o |

What is claimed is:

1. A compound of the general formula

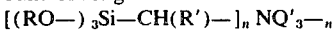

in which
 n has one of the numerical values 2 and 3;
 R is an alkyl radical having one to four carbon atoms;
 R' is a member selected from the group consisting of hydrogen, alkyl containing one to six carbon atoms, cyclohexyl, and phenyl; and Q' is a member selected from the group consisting of alkenyl having two to four carbon atoms, and aralkyl having seven to 10 carbon atoms.

2. An N—bis—(triethyoxysilylmethyl)—amino compound according to claim 1, having the formula $$[(C_2H_5O-)_3Si-CH_2-]_2NQ'$$

wherein

Q' has the same meaning as defined in claim 1.

3. N—Bis—(triethoxysilylmethyl)—allylamine according to claim 2, having the formula $$[(C_2H_5O-)_3Si-CH_2-]_2N-CH_2-CH \cdot CH_2.$$

4. N—Bis—(triethoxysilylmethyl)—benzylamine according to claim 2, having the formula

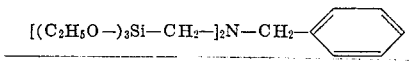

5. N—Bis—(triethoxysilylmethyl)—β—phenylethylamine according to claim 2, having the formula

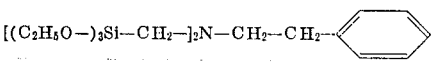

* * * * *

FO-1050
(5/69)

UNITED STATES PATENT OFFICE
CERTIFICATE OF CORRECTION

Patent No. __3,621,047__    Dated __November 16, 1971__

Inventor(s) __Hans Dietrich Golitz et al__

It is certified that error appears in the above-identified patent and that said Letters Patent are hereby corrected as shown below:

Abstract, line 18    (Spec. line 18)

"$NQ_3{}'7E'n$"    should be    --$NQ_{3-n}$--

Col. 1, line 73    (Spec. p.4, line 5)

"MOreover"    should be    --Moreover--

Col. 3, line 26    (Spec. p.7, line 3)

"Xmm."    should be    --mm--

Col. 3, lines 47 and 48    (Spec. P. 7, line 20)

Delete "g. of finely ground calcium carbonate and containing o.06"

Col. 4, line 27    (Spec. p.7, line 5)

"$CH_3 13\ Si$"    should be    --$CH_3-Si$-- line 30    (Spec. line 8)

"[b-$N(CH_3)$"    should be    --[-$N(CH_3)$--

Signed and sealed this 23rd day of May 1972.

(SEAL)
Attest:

EDWARD M.FLETCHER,JR.        ROBERT GOTTSCHALK
Attesting Officer            Commissioner of Patents